(12) United States Patent
Wilson et al.

(10) Patent No.: US 8,096,620 B2
(45) Date of Patent: Jan. 17, 2012

(54) INJECTION MOLD SEAT RISER FOR MODULAR SCHOOL BUS SEATS

(75) Inventors: Erik C. Wilson, Decatur, IN (US); Yogesh D Aundhkar, Pune (IN); Atul P Khanapurkar, Pune (IN); Narasimha D Gupta, Pune (IN)

(73) Assignee: International Truck Intellectual Property Company, LLC, Warrenville, IL (US)

(*) Notice: Subject to any disclaimer, the term of this patent is extended or adjusted under 35 U.S.C. 154(b) by 205 days.

(21) Appl. No.: 12/431,205

(22) Filed: Apr. 28, 2009

(65) Prior Publication Data

US 2010/0270845 A1    Oct. 28, 2010

(51) Int. Cl.
*A47C 7/00* (2006.01)

(52) U.S. Cl. ........... 297/440.14; 297/440.16; 297/446.1; 297/448.1; 297/450.1; 297/451.8

(58) Field of Classification Search ............ 297/440.1, 297/440.14, 440.15, 440.16, 446.1, 448.1, 297/450.1, 451.8, 451.11
See application file for complete search history.

(56) References Cited

U.S. PATENT DOCUMENTS

| | | | | |
|---|---|---|---|---|
| 210,500 | A | * | 12/1878 | Clough .......................... 297/342 |
| 816,209 | A | * | 3/1906 | Beall ............................. 297/343 |
| 2,588,417 | A | * | 3/1952 | Schladermundt et al. . 297/448.1 |
| 2,593,270 | A | * | 4/1952 | Clifton ..................... 297/411.27 |
| 3,619,006 | A | * | 11/1971 | Barecki ...................... 297/450.1 |
| 3,639,001 | A | * | 2/1972 | Anderson .................. 297/451.1 |
| 3,944,283 | A | * | 3/1976 | Molzon .................... 297/452.39 |
| 4,002,369 | A | * | 1/1977 | Jennings .................. 297/451.11 |
| 4,118,061 | A | * | 10/1978 | Atkinson et al. ................ 296/63 |
| 4,311,337 | A | * | 1/1982 | Brunn ........................... 297/249 |
| 4,490,949 | A | * | 1/1985 | Sutter et al. ........................ 52/9 |
| 4,522,443 | A | * | 6/1985 | Van Blankenburg ...... 297/158.3 |
| 5,050,932 | A | * | 9/1991 | Pipon et al. .............. 297/354.12 |
| 5,511,849 | A | * | 4/1996 | Cahaley et al. ............... 297/129 |
| 5,575,533 | A | | 11/1996 | Glance |
| D394,166 | S | * | 5/1998 | Rossman et al. ............... D6/367 |
| 6,752,465 | B2 | * | 6/2004 | Igarashi ................... 297/452.18 |
| 6,886,889 | B2 | | 5/2005 | Vits et al. |
| 6,929,275 | B1 | * | 8/2005 | Schlangen ................. 280/250.1 |
| 7,134,728 | B1 | * | 11/2006 | Buhrman ................. 297/440.14 |
| 7,303,235 | B1 | | 12/2007 | Fongers |
| 7,740,320 | B2 | * | 6/2010 | Chiang .................... 297/440.15 |
| 2008/0018161 | A1 | * | 1/2008 | Evans ...................... 297/440.14 |

\* cited by examiner

*Primary Examiner* — Laurie Cranmer

(74) *Attorney, Agent, or Firm* — Jeffrey P. Calfa; Mark C. Bach; Gerald W. Askew

(57) ABSTRACT

A modular seat frame for a school bus seat includes riser assemblies for supporting the seat fabricated from a moldable material reinforced locally by attachment and reinforcement members.

4 Claims, 3 Drawing Sheets

INJECTION MOLD SEAT RISER FOR MODULAR SCHOOL BUS SEATS

BACKGROUND OF THE INVENTION

1. Technical Field

The present invention relates to school bus seats and more particularly to an injection-molded riser for a modular school bus seat frame which provides a reduced weight, high strength, module.

2. Description of the Problem

School bus seats are built to meet many differing customer specifications. For example, some bus seats must accommodate three point safety belts by providing a compatible upper back rest, other specifications call for a universal child restraint attachment equipped lower frame, while still others provide standard DOT (United States Department of Transportation) seat backs. At the same time customers can specify seats in different widths or heights and can demand various strength requirements be met.

Meeting such diverse specifications have required manufacturers stock substantially or entirely different component sets in order to produce seats. The need to supply such component sets has even occurred relative to completed vehicles that have been put into service where the vehicle has been moved from one state or municipality to another, based on differing requirements of the new jurisdiction. Modularity of the components, that is the ability to use one component to build seats meeting different functionality, can reduce the number of different components required to construct seats adapted to particular customer requirements.

Modular construction of bus seat frames is known, one example being taught in U.S. Pat. No. 6,886,889 to Vits et al. FIGS. 18-20 of the Vits '889 patent teach a modular seat based on four major sub-assemblies. The sub-assemblies include a frame assembly, a floor mount assembly, a passive restraint panel and a seat member. The floor mount assembly in turn comprises one or two pedestals on which frame elements for a seat bench rest. In some embodiments one of the pedestals is replaced by a wall mount bracket shown in FIGS. 26 and 27 of the patent. Vits does not describe fabrication of the pedestals at length.

U.S. Pat. No. 7,303,235 to Fongers described a chair for mounting to a bleacher seat where the chair was an injection molded seat with strategically shaped and positioned strengthening ribs being inherent to the seat elements.

SUMMARY OF THE INVENTION

The invention provides a riser assembly for a modular seat assembly for school busses. The riser assembly includes a riser, a support neck reinforcement member for supporting a seat back frame from the riser, floor attachment members, localized reinforcement pieces and a front cross member attachment member. The riser is preferably molded from glass or talc filled polypropylene or nylon. The riser is molded with strengthening ridges disposed in an egg crate pattern, that is, a major face of the riser includes a plurality of strengthening ridges disposed in two mutually orthogonal sets. The riser is molded to conform with the attachment members and reinforcement pieces by providing slots into which some attachment members can be fitted.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
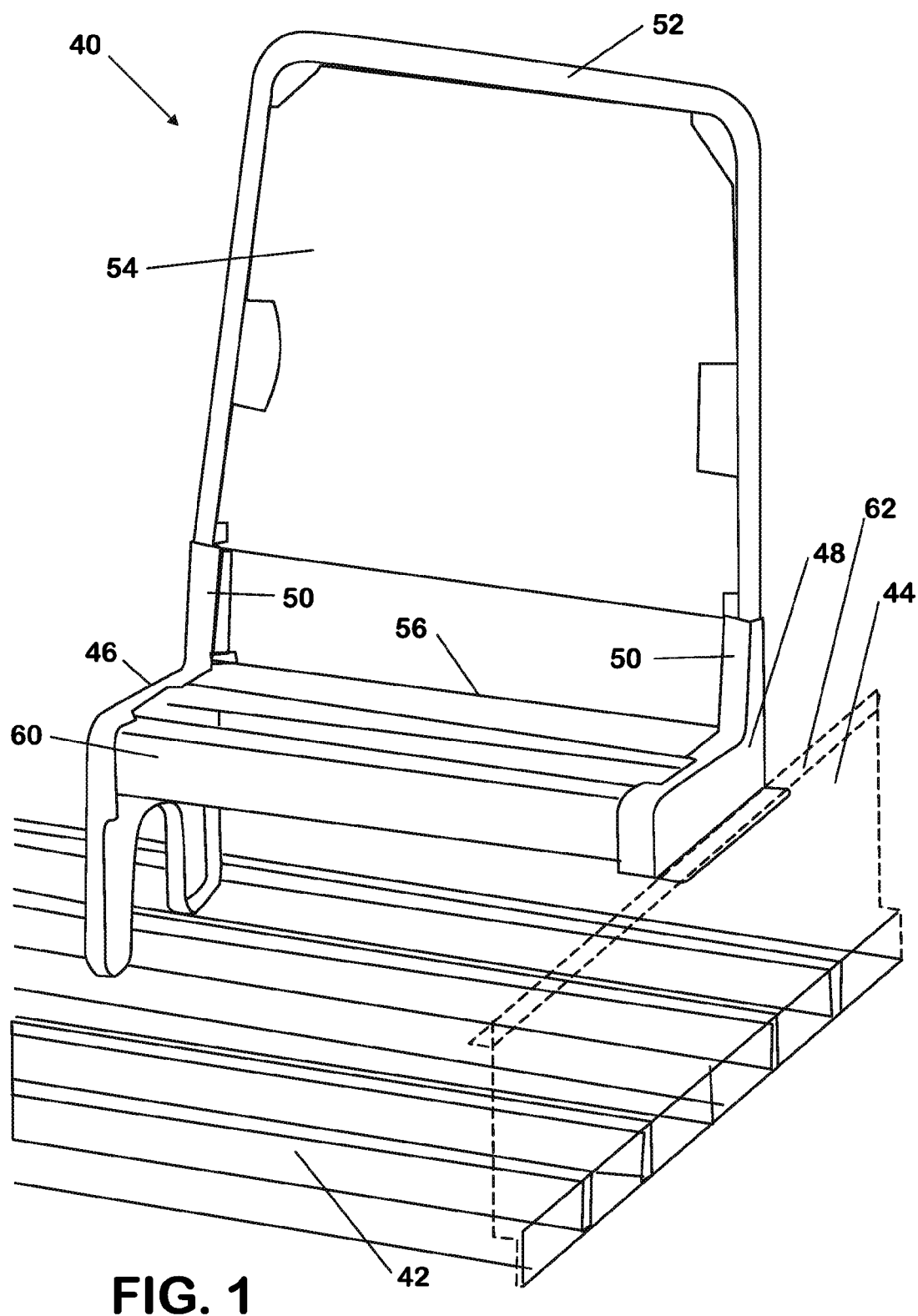
FIG. 1 is a perspective view of a school bus seat frame.

Referring now to the drawings and in particular to FIG. 1, an assembled modular school bus seat frame 40 is illustrated. Modular school bus seat frame 40 is installed upright on a bus floor 42. Modular frame 40 is supported on its inside end from a chair rail 62 of a school bus interior wall 44 and along its opposed end adjacent a center aisle from the floor 42. Support from the wall 44 is provided by a wall riser 48. Support from the floor 42 is provided by an aisle riser assembly 46. Aisle riser assembly 46 and wall riser 48 differ from the aisle risers and floor risers known from the art in that they form part of what would traditionally be considered the frame itself, and are not simply pedestals on which the seat frame is mounted. The aisle riser assembly 46 includes a support neck 50 which provides a base of support for an open, partial perimeter tube 52 used to define the top and sides of a seat back portion of frame 40. The partial perimeter tube 52 is a C shaped element mounted at opposite ends in necks 50. Perimeter tube 52 defines the top and sides of the seat back. Suspended on and within the partial perimeter tube 52 is a seat back panel 54. Extending between and fitted into the aisle riser assembly 46 and the wall riser 48 are front and back latitudinal supports 60 and 56. Supports 56 and 60 come in varying lengths to support seats of varying widths. Riser assembly 46 includes a riser which is molded and has an interior side (the side facing away from the aisle for a riser assembly installed adjacent the aisle or the side oriented toward the aisle for a riser installed adjacent a side wall of the vehicle) which is formed with a moderately dense egg crate pattern of intersecting reinforcing ribs to add structural strength to the riser.

Figure 2:
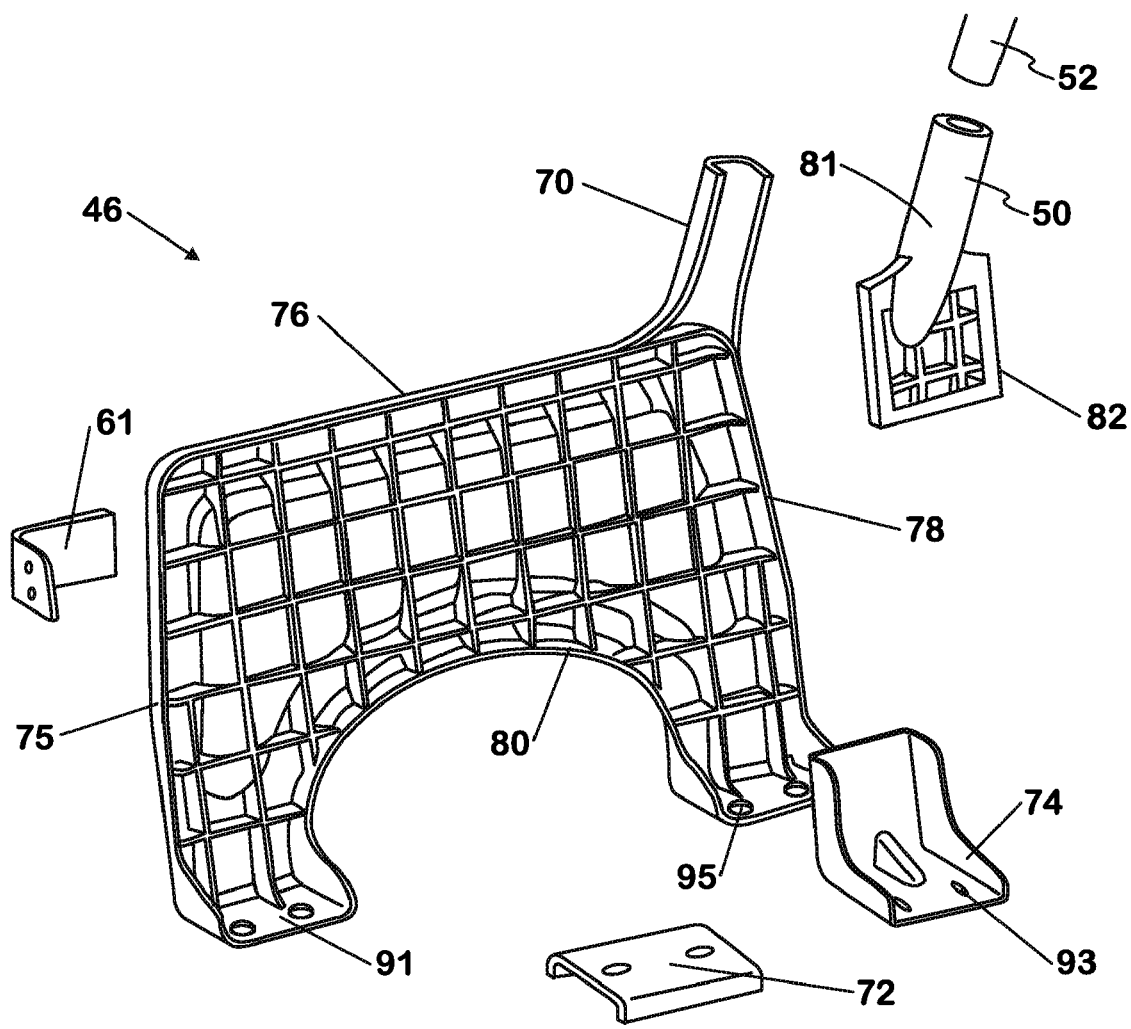
FIG. 2 is an exploded view of a seat riser assembly for the school bus seat frame of FIG. 1.

FIG. 2 illustrates the components of a riser assembly 46 featuring the interior side or major face 75 of riser 76. The interior side 75 features particularly a plurality of horizontal ribs 78 and vertical ribs 80 which intersect and operate to strengthen the riser 76. The sets of ribs 80 and 78 should be formed in the molding process to be substantially orthogonal, though it is not essential that they be vertical and horizontal. In addition, various attachment members and reinforcing plates are illustrated. These are provided at points of particular stress, such as the point of attachment of the riser 46 with the floor and the point of attachment of the seat back tube 52.

A neck member 50 includes a tube section 81 which mates with one end of tube 52 and a gusset 82 which may be joined with the main body of riser 76 by being fitted against the egg crate pattern of ribs 78, 80. The tube section 81 of neck member 50 is sized to fit snugly within a riser extension 70 which is an open faced trough. Neck member may also be made of the same material as the riser 76.

A rear floor mounting member and reinforcement plate 74 reinforces the riser 76 at another point of stress, that is the point of attachment of riser 76 to the floor of a bus at the back of riser 76. Rear floor mounting member 74 is an L shaped member which fits against an aft, downward extension of the riser 76, which terminates in a foot 90. Holes 93 through member 74 may be aligned with holes 95 through the foot 90 for the insertion of fasteners (not shown). Similarly a smaller mounting plate 72 is used with the front foot of the riser 76.

Riser 76 provides for the attachment of cross members to support a seat using attachment plates such as attachment plate 61, which fits to the front portion of the riser. Plate 61 includes a right angle bend to accommodate a cross member which extends between the aisle riser assembly and a wall riser assembly.

Figure 3:
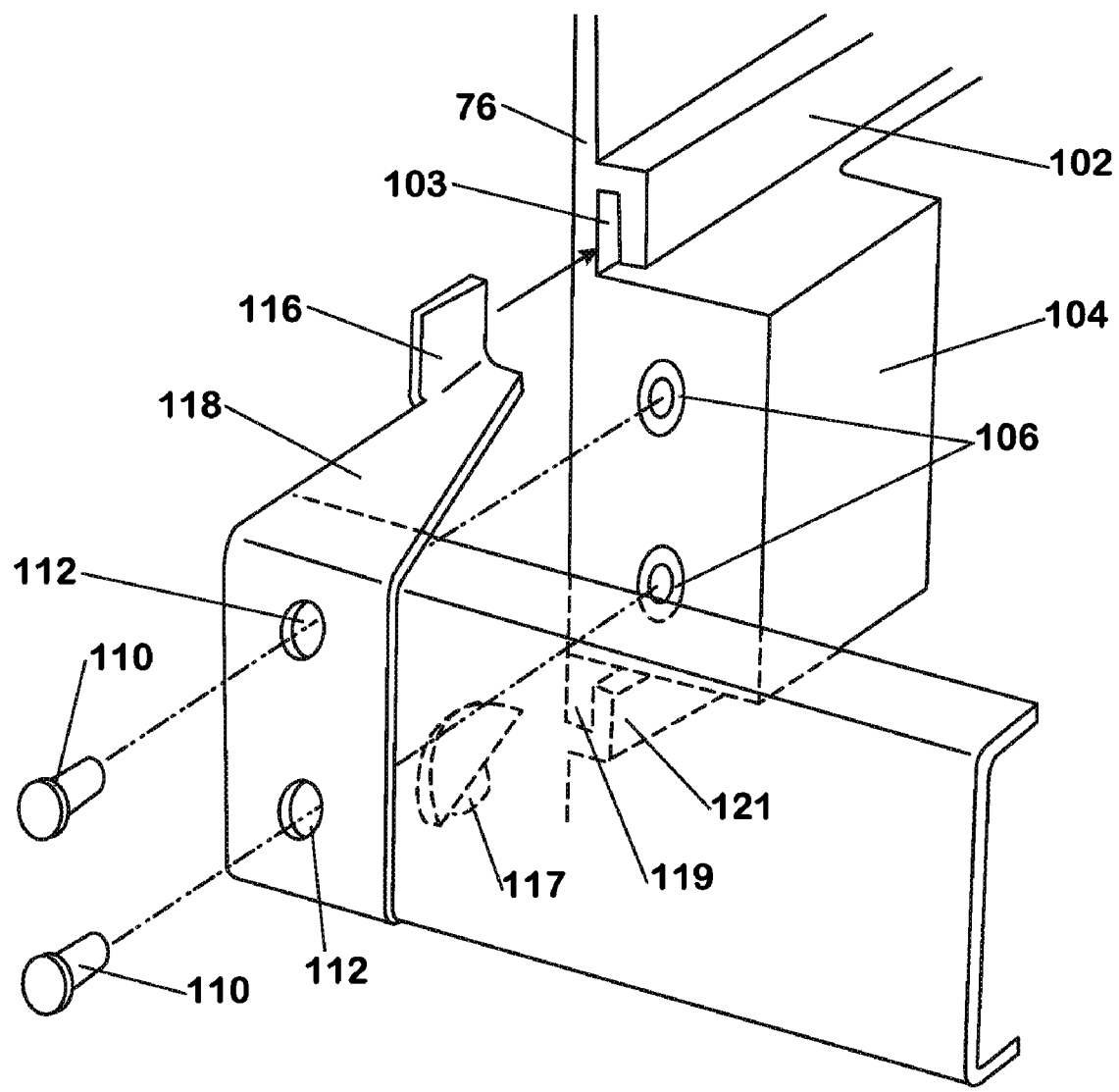
FIG. 3 is a detail view of molded features of the riser adapted to receive a representative attachment member.

Referring to FIG. 3, an attachment member 118 for a seat frame member 150 is illustrated, as well as modifications made along an edge of riser 76 which provide for easy connection of the attachment member to the riser. Riser 76 incorporates an L shaped ridge 102 which in turn defines a slot 103. A block 104 is formed in the riser 76 below the ridge 102. Similarly a second ridge 121 is disposed below the block 104 defining a second slot 119. Attachment member 118 is a C shaped bracket, preferably made of metal which includes tabs 116 and 117 at the ends of upper and lower "arms" of the C. Tabs 116, 117 mate with slots 103 and 119, respectively, as part of attaching the member 118 to the riser 76. A seat frame member 150, which itself is shaped as a shallow C in cross section, fits snugly inside attachment member 118 and brackets block 104. Holes 112 through attachment member 118 and holes 106 in block 104 may be aligned for the insertion of fasteners 110. The use of fasteners avoids the use of welding which can thermally weaken components.

While only a preferred embodiment is described here, the claims are not thus limited but is cover various changes and modifications to that embodiment without departing from the spirit and scope of the claims.

What is claimed is:

1. A riser assembly for a modular seat frame for a school bus comprising:
   a riser formed of a moldable material and having a major face;
   a plurality of support ribs disposed on the major face and defining the major face as an interior face;
   a riser extension including an open trough for locating one end of a seat back frame member and providing a point of attachment for one end of the seat back frame member; and
   at least a first neck reinforcement member for installation on the riser at the point of attachment, said at least first neck reinforcement member including a tube section which fits snugly in the open trough to reinforce the open trough of the riser extension and a gusset depending from an end of the tube section which fits against the support ribs of the interior face; and
   the tube section of the first neck reinforcement member being shaped to mate with the one end of the seat back.

2. A riser assembly as claimed in claim 1, further comprising:
   the support ribs being divided into first and second sets, the support ribs of the first set being mutually parallel to one another and orthogonal to the ribs of the second set.

3. A modular seat frame comprising:
   a riser assembly including a riser formed of a moldable material and having a major face bearing a plurality of support ribs;
   an open trough extending from the riser assembly to provide a location for attachment of a seat back frame member; and
   a neck reinforcement member having a tube section which fits flush in the open trough for reinforcing the riser assembly locally and which allows for mating attachment of the seat back frame member, and a gusset section which is formed to fit against the riser.

4. A modular seat frame as claimed in claim 3, the riser assembly further comprising:
   the plurality of support ribs being divided into two sets, the support ribs of any one set being mutually parallel to one another and the different sets being orthogonal.

* * * * *